US009925962B2

(12) United States Patent
Narahara et al.

(10) Patent No.: US 9,925,962 B2
(45) Date of Patent: Mar. 27, 2018

(54) STOP MAINTAINING SYSTEM OF VEHICLE

(71) Applicant: Mazda Motor Corporation, Aki-gun, Hiroshima (JP)

(72) Inventors: Koichi Narahara, Hiroshima (JP); Atsushi Kanahori, Higashihiroshima (JP); Shigeyuki Uehara, Hiroshima (JP); Masaru Takase, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/349,176

(22) Filed: Nov. 11, 2016

(65) Prior Publication Data

US 2017/0166174 A1 Jun. 15, 2017

(30) Foreign Application Priority Data

Dec. 14, 2015 (JP) .................................. 2015-243315

(51) Int. Cl.
| *B60T 7/00* | (2006.01) |
| *B60T 8/171* | (2006.01) |
| *B60T 7/12* | (2006.01) |
| *B60T 8/24* | (2006.01) |
| *B60T 8/58* | (2006.01) |

(Continued)

(52) U.S. Cl.
CPC ............... *B60T 8/171* (2013.01); *B60T 7/12* (2013.01); *B60T 7/122* (2013.01); *B60T 8/241* (2013.01); *B60T 8/245* (2013.01); *B60T 8/58* (2013.01); *B60T 13/741* (2013.01); *B60T 17/22* (2013.01); *B60T 7/00* (2013.01); *B60T 2201/06* (2013.01)

(58) Field of Classification Search
None
See application file for complete search history.

(56) References Cited

U.S. PATENT DOCUMENTS

| 8,821,348 | B2 * | 9/2014 | Yu ....................... F02N 11/0822 |
| | | | 477/203 |
| 9,517,770 | B2 * | 12/2016 | Yu ........................... B60T 7/122 |
| 9,731,722 | B2 * | 8/2017 | Khafagy ......... B60W 30/18109 |

FOREIGN PATENT DOCUMENTS

JP 4961857 B2 6/2012

* cited by examiner

*Primary Examiner* — Dirk Wright
(74) *Attorney, Agent, or Firm* — Alleman Hall Creasman & Tuttle LLP

(57) ABSTRACT

A vehicle stop maintaining system comprises an automatic transmission, an automatic stop-restart mechanism for automatically stopping and restarting an engine, a foot brake mechanism for braking vehicle wheels through hydraulic brake mechanisms, a brake force control mechanism having a pressurizer that increases hydraulic brake pressure applied to the hydraulic brake mechanisms, and for braking the wheels by controlling the pressurizer independently from brake pedal depression, a controller configured to maintain a vehicle stopped state by operating the automatic stop-restart mechanism to stop the engine and operating the brake force control mechanism to keep initial hydraulic brake pressure according to the brake pedal depression, and a drive force state determining module for determining a drive force stabilized timing. The controller operates the automatic stop-restart mechanism to restart the engine and operates the brake force control mechanism to release the initial hydraulic brake pressure when accelerator pedal depression is detected.

5 Claims, 8 Drawing Sheets

(51) Int. Cl.
*B60T 13/74* (2006.01)
*B60T 17/22* (2006.01)

STOP MAINTAINING SYSTEM OF VEHICLE

BACKGROUND

The present invention relates to a stop maintaining system of a vehicle, particularly to a stop maintaining system of a vehicle which is capable of reducing generation of creep groan.

As conventional brake devices of vehicles, foot brake devices which brake vehicle wheels by applying hydraulic brake pressure to hydraulic brake mechanisms according to a depression of a brake pedal, brake force control devices which include a pressurizer for increasing hydraulic brake pressure applied to hydraulic brake mechanisms, and brake vehicle wheels by controlling the pressurizer independently from the depression of a brake pedal, and electric parking brake devices which brake vehicle wheels by operating electric brake mechanisms which are driven by electric actuators independently from the depression of a brake pedal, are known.

Further, arts for reducing, when a vehicle is detected to be in a stopped state, a burden on a vehicle driver which accompanies the depression of a brake pedal by operating an electric parking brake device which is represented by an Anti-lock Brake System (ABS) or a Dynamic Stability Control (DSC) system, are proposed.

JP4961857B discloses an automatic brake force control device of a vehicle. While an auto hold control for maintaining a stopped state of a vehicle by maintaining hydraulic brake pressure due to the depression of a brake pedal by a vehicle driver is performed, if an auto hold control release condition (e.g., an accelerator pedal is depressed) is satisfied, the automatic brake force control device sharply reduces the hydraulic brake pressure at a first gradient and then at a timing when a brake force corresponding to the hydraulic brake pressure matches a drive force of an engine, gently reduces the hydraulic brake pressure at a second gradient which is gentler than the first gradient.

Thus, a shock which occurs immediately after starting the vehicle is reduced while lowering a burden on the driver.

Meanwhile, in order to improve fuel consumption and emission performance, vehicles including an engine automatic stop-restart mechanism are known.

In such a vehicle including the engine automatic stop-restart mechanism, when a stopped state of the vehicle is detected due to a traffic light etc. during traveling, the engine is stopped by cutting fuel supply to the engine, and then when depression of an accelerator pedal is detected, the fuel supply to the engine is started to restart the engine.

In vehicles mounted with an automatic transmission including a torque converter, when shifting from a stopped state where a brake pedal is depressed to starting by loosening the depression of the brake pedal, a stick-slip phenomenon occurs between friction surfaces of a brake pad and a rotor disk within a given hydraulic brake pressure range, thus, an abnormal sound (creep groan) occurs.

The creep groan is considered to occur in the following manner. In a vehicle start, energy is accumulated once the hydraulic brake pressure is maintained until around when the brake force corresponding to the hydraulic brake pressure matches the drive force of the engine, while causing an elastic deformation in a friction member of the brake pad.

This accumulated energy is released at once after the brake force corresponding to the hydraulic brake pressure matches the drive force of the engine, and converted into a periodic force variation, i.e., repetition of a static-frictional engagement and a dynamic-frictional engagement. This vibration force causes resonance around the brake and suspension.

The automatic brake force control device of JP4961857B controls a latter part of a release characteristic of the hydraulic brake pressure to be the second gradient which is gentler than the first gradient which is the release rate for an early part of the release. Thus, a jump start of the vehicle is prevented and a starting performance is improved.

However, with the art of JP4961857B, since the second gradient which is the release rate for the latter part is gentler than the first gradient which is the release rate for the early part, a period of time for which the hydraulic brake pressure remains within a stick-slip occurable range within which the repetition of the static-frictional engagement and the dynamic-frictional engagement may occur becomes long and the creep groan may occur for a while.

Although it may be considered to increase the release rate of the hydraulic brake pressure in order to shorten the time for the hydraulic brake pressure to pass the stick-slip occurable range, there is a concern of degradation of the starting performance of the vehicle. Especially with the vehicle equipped with the engine automatic stop-restart mechanism, since a hydraulic brake pressure release condition is the same as an engine restart condition and the hydraulic brake pressure is released at the same time as when the engine restarts, if the release rate of the hydraulic brake pressure is simply increased, the vehicle wheels begin to be driven (the vehicle starts traveling) even though the drive force of the engine is not stabilized, and the engine may stall (cause a misfire).

SUMMARY

The present invention is made in view of the above issues, and aims to provide a stop maintaining system of a vehicle which is capable of obtaining a suitable starting performance of the vehicle and reducing generation of creep groan.

According to one aspect of the present invention, a vehicle stop maintaining system is provided, which comprises an automatic transmission, an automatic stop-restart mechanism for automatically stopping and restarting an engine according to an operating state of a vehicle in a transmittable state of a drive torque of the engine to vehicle wheels, a foot brake mechanism configured to brake the vehicle wheels through hydraulic brake mechanisms, a brake force control mechanism comprising a pressurizer that increases hydraulic brake pressure that is applied to the hydraulic brake mechanisms, and for braking the vehicle wheels by controlling the pressurizer independently from a depression of a brake pedal, and a controller comprising a processor configured to maintain a stopped state of the vehicle when the stopped state is detected by operating the automatic stop-restart mechanism to stop the engine and operating the brake force control mechanism to maintain an initial hydraulic brake pressure according to the brake pedal depression, the controller operating the automatic stop-restart mechanism to restart the engine and operating the brake force control mechanism to release the initial hydraulic brake pressure when at least the depression of an accelerator pedal is detected. The processor is further configured to execute a drive force state determining module to determine a drive force stabilized timing when the drive force of the engine stabilizes. In the restart of the engine, the controller controls the hydraulic brake pressure to have a characteristic in which a late-stage release rate of the hydraulic brake pressure that is applied after reaching a first medium hydraulic pressure set near a highest hydraulic brake pressure of a stick-slip occurable range is higher than an early-stage release rate of the hydraulic brake pressure before reaching the first medium hydraulic pressure, and the brake force corresponding to hydraulic brake pressure at the late-stage release rate falls below the drive force of the engine after the drive force stabilized timing, the stick-slip occurable range being a range that has a possibility of causing repetition of a static-frictional engagement and a dynamic-frictional engagement in the hydraulic brake mechanisms.

With the vehicle stop maintaining system, the drive force state determining module for determining the drive force stabilized timing when the drive force of the engine stabilizes is provided, and thus, the drive force stabilized timing is determinable.

In the restart of the engine, the controller controls the hydraulic brake pressure to have the characteristic in which the late-stage release rate of the hydraulic brake pressure that is applied after reaching the first medium hydraulic pressure set near the highest hydraulic brake pressure of the stick-slip occurable range is higher than the early-stage release rate of the hydraulic brake pressure before reaching the first medium hydraulic pressure. Thus, a period for which the hydraulic brake pressure remains within the stick-slip occurable range is shortened, which reduces generation of creep groan.

Additionally in the restart of the engine, the controller controls the hydraulic brake pressure to have the characteristic in which the brake force corresponding to the hydraulic brake pressure at the late-stage release rate falls below the drive force of the engine after the drive force stabilized timing. Thus, the vehicle wheels begin to be driven after the drive force of the engine stabilizes, which prevents an engine stall and improves a starting performance of the vehicle.

A period for which the early-stage release rate of the hydraulic brake pressure is applied may be divided into a first period corresponding to an initial release rate applied between the initial hydraulic brake pressure and a second medium hydraulic pressure that is set higher than the first medium hydraulic pressure, and a second period corresponding to an intermediate release rate applied between the second medium hydraulic pressure and the first medium hydraulic pressure. The initial release rate may be set higher than the intermediate release rate.

According to the configuration, by setting the intermediate release rate to be lower, a period for which high hydraulic brake pressure acts on the brake force control mechanism is shortened. By shortening the period from the timing of the first medium hydraulic pressure to the timing when the brake force corresponding to the hydraulic brake pressure falls below the drive force of the engine, energy accumulated in the hydraulic brake mechanisms etc. is reduced even more.

The intermediate release rate may be set so that the hydraulic brake pressure reaches the first medium hydraulic pressure after the drive force stabilized timing.

According to the configuration, it is possible to easily set the characteristic of the hydraulic brake pressure to the characteristic in which the brake force corresponding to the hydraulic brake pressure at the late-stage release rate falls below the drive force of the engine after the drive force stabilized timing.

The controller may increase the first medium hydraulic pressure according to an orientation of the vehicle and, when the increased first medium hydraulic pressure becomes higher than the second medium hydraulic pressure, increase the second medium hydraulic pressure to exceed the increased first medium hydraulic pressure.

According to the configuration, the generation of the creep groan is reduced without causing the engine stall even if the vehicle is in an upward orientation.

DETAILED DESCRIPTION OF EMBODIMENT

Hereinafter, an embodiment of the present invention is described in detail with reference to the appended drawings.

The following description is an illustration of the present invention applied to a stop maintaining system of a vehicle, and is not intended to limit the scope of the present invention, application thereof, or usage thereof.

Hereinafter, the embodiment of the present invention is described with reference to FIGS. 1 to 8.

A vehicle V of this embodiment is mounted with a stop maintaining system 1.

Figure 1:
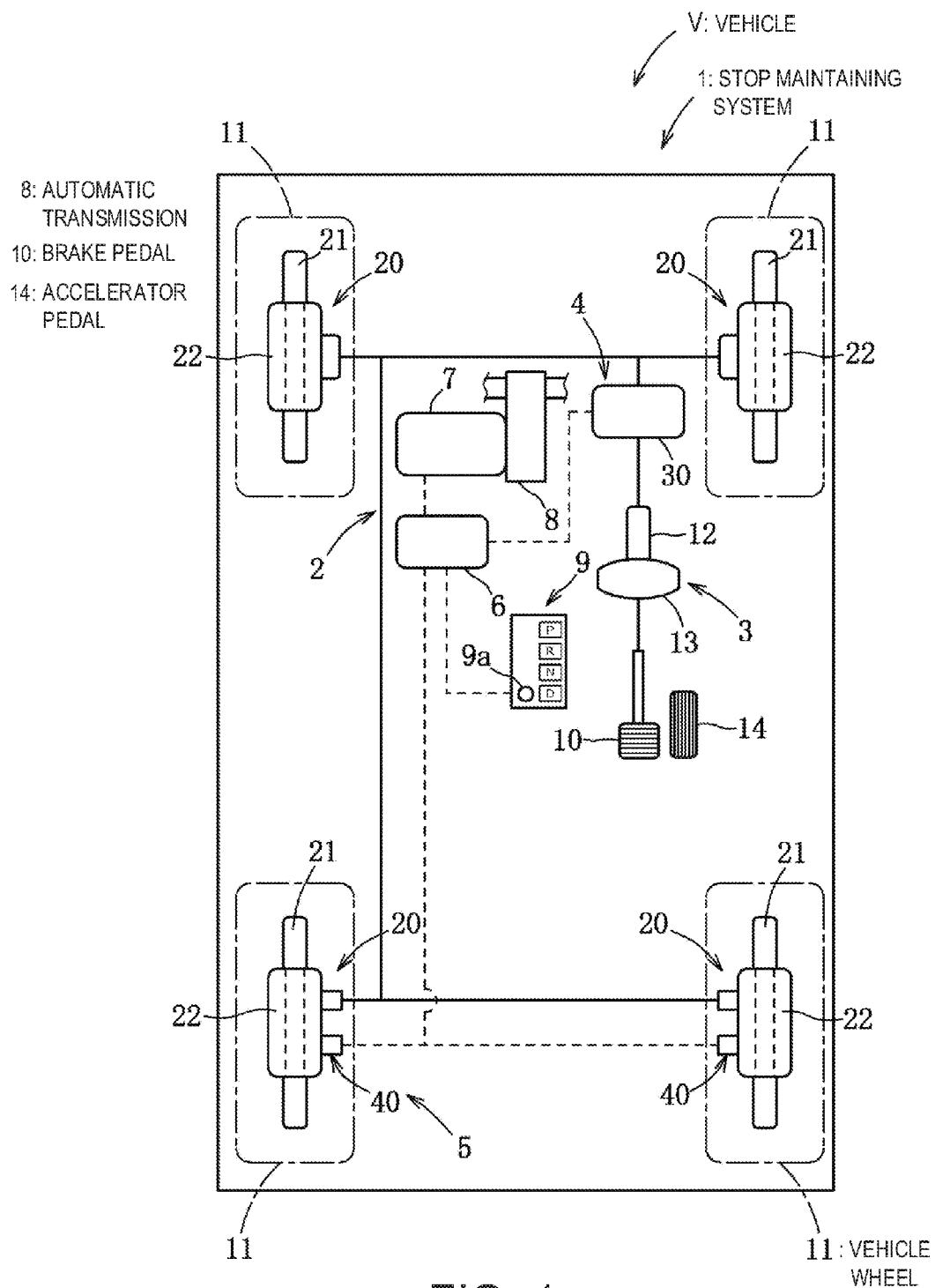
FIG. 1 is a schematic view of a vehicle on which a stop maintaining system of the vehicle according to one embodiment is mounted.
Figure 2:
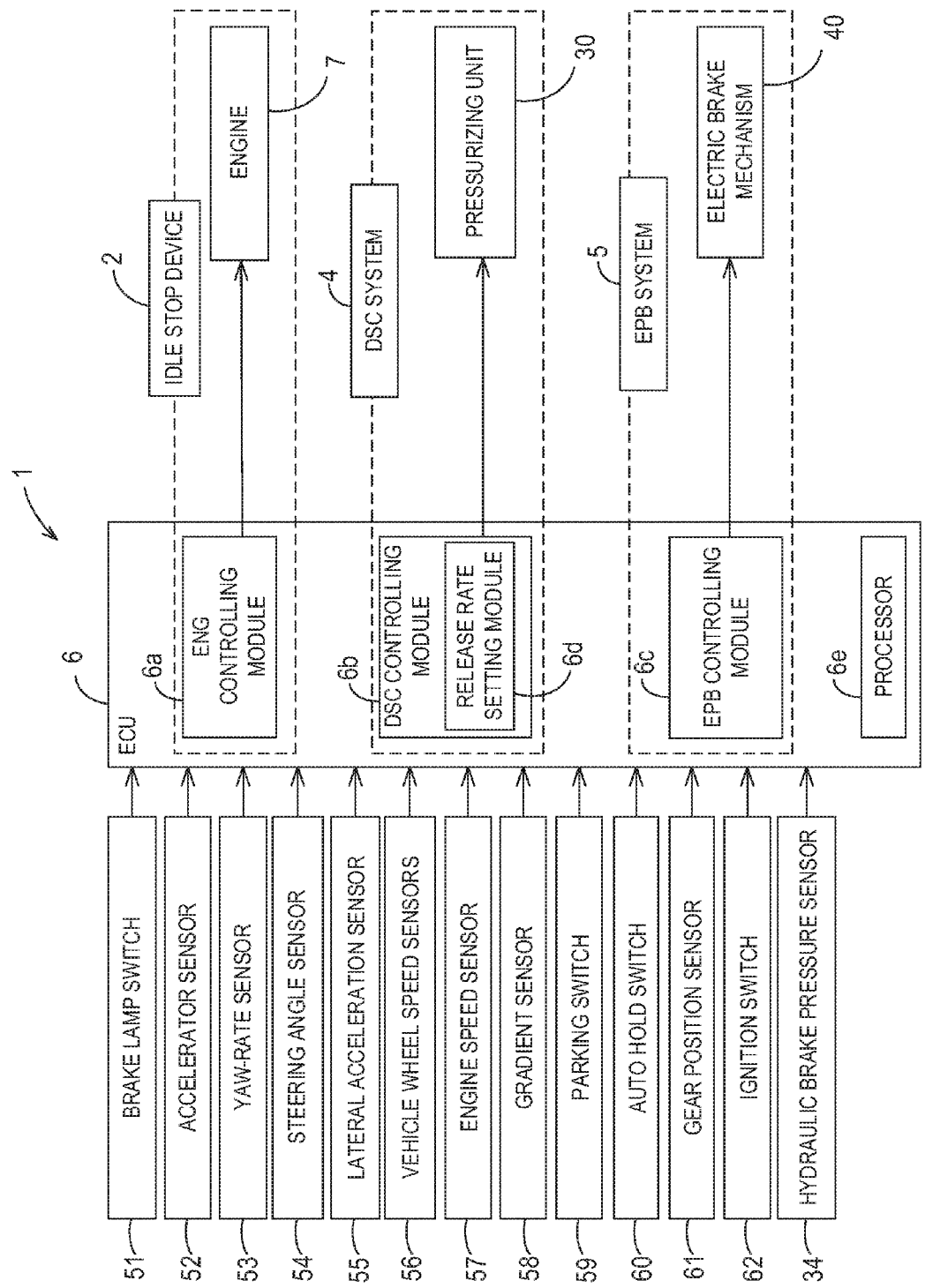
FIG. 2 is a block diagram of the stop maintaining system.

As illustrated in FIGS. 1 and 2, the stop maintaining system 1 includes an idle stop device 2 (automatic stop-restart mechanism), a foot brake device 3 (foot brake mechanism), a DSC (Dynamic Stability Control) system 4 (brake force control mechanism), an EPB (Electric Parking Brake) system 5, and an ECU (Electronic Control Unit) 6 (Controller).

First, the idle stop device 2 is described.

The idle stop device 2 automatically stops and restarts an engine 7 according to an operating state of the vehicle V in a transmittable state of a drive torque of the engine 7 to drive wheels.

As illustrated in FIG. 2, the idle stop device 2 is comprised of an ENG (Engine) controlling module 6a (drive force state determining module) and the engine 7.

The engine 7 transmits drive force (drive torque) to an automatic transmission 8 by engaging clutches (not illustrated) through a torque converter (not illustrated).

The engine 7 stops injecting fuel in response to an engine stop command from the ENG controlling module 6a, and restarts in response to an engine restart command.

The automatic transmission 8, in response to input signals from various sensors, converts the drive force inputted from the engine 7 into a given torque and speed according to a traveling state and a gear range selected by a vehicle driver, and transmits them to the drive wheels through a gear train and a differential (neither is illustrated).

The ENG controlling module 6a, in response to the input signals from the sensors, outputs execution signals to automatically stop (idle stop) the engine 7 if an engine stop condition (depression of a brake pedal 10 continues over a given period of time) is determined as satisfied, and restart the engine 7 after the automatic stop thereof if an engine restart condition (an accelerator pedal 14 is depressed) is determined as satisfied.

The ENG controlling module 6a detects a cranking period in which a starter motor (not illustrated) performs rotational drive when restarting the engine, a drive force unstable period when the drive force of the engine 7 is unstable (engine hunting), and a drive force stable period when the drive force stabilizes after the drive force unstable period.

Here, the cranking period is a period in which a speed of the engine 7 is equal to or below a rotational speed of the starter motor, the drive force unstable period is a period in which a difference between a highest variation value and a lowest variation value of the drive force is a given threshold or above, and the drive force stable period is a period in which the difference between the highest variation value and the lowest variation value of the drive force is below the given threshold.

The ENG controlling module 6a stores time lengths obtained based on moving averages between an engine restart timing and a cranking completion timing previously performed and between the engine restart timing and a drive force stabilized timing previously performed, as a cranking completion determining period and a drive force stabilization determining period, respectively. In the engine restart, the ENG controlling module 6a determines the cranking completion timing and the drive force stabilized timing respectively based on lapse of time from the engine restart.

As illustrated in FIG. 1, a gear shift device 9 includes a gear shift lever 9a which is controllable by the driver, a shift indicator corresponding to D-, N-, R- and P-ranges which are designed in this order from the bottom side of the drawing, and a gear position sensor 61 (see FIG. 2) provided inside the device 9.

The gear position sensor 61 detects a gear position corresponding to a gear range selected by the driver based on a relative position of a movable sensor attached to a slider which slides corresponding to a movement of the gear shift lever 9a with respect to a fixed sensor attached to a supporting part (not illustrated) supporting the slider.

Next, the foot brake device 3 is described.

The foot brake device 3 brakes two front and rear pairs of vehicle wheels 11 (drive wheels) by supplying to two front and rear pairs of hydraulic brake mechanisms 20, brake fluid pressurized according to depression of the brake pedal 10 (hereinafter, referred to as the hydraulic brake pressure).

Figure 3:
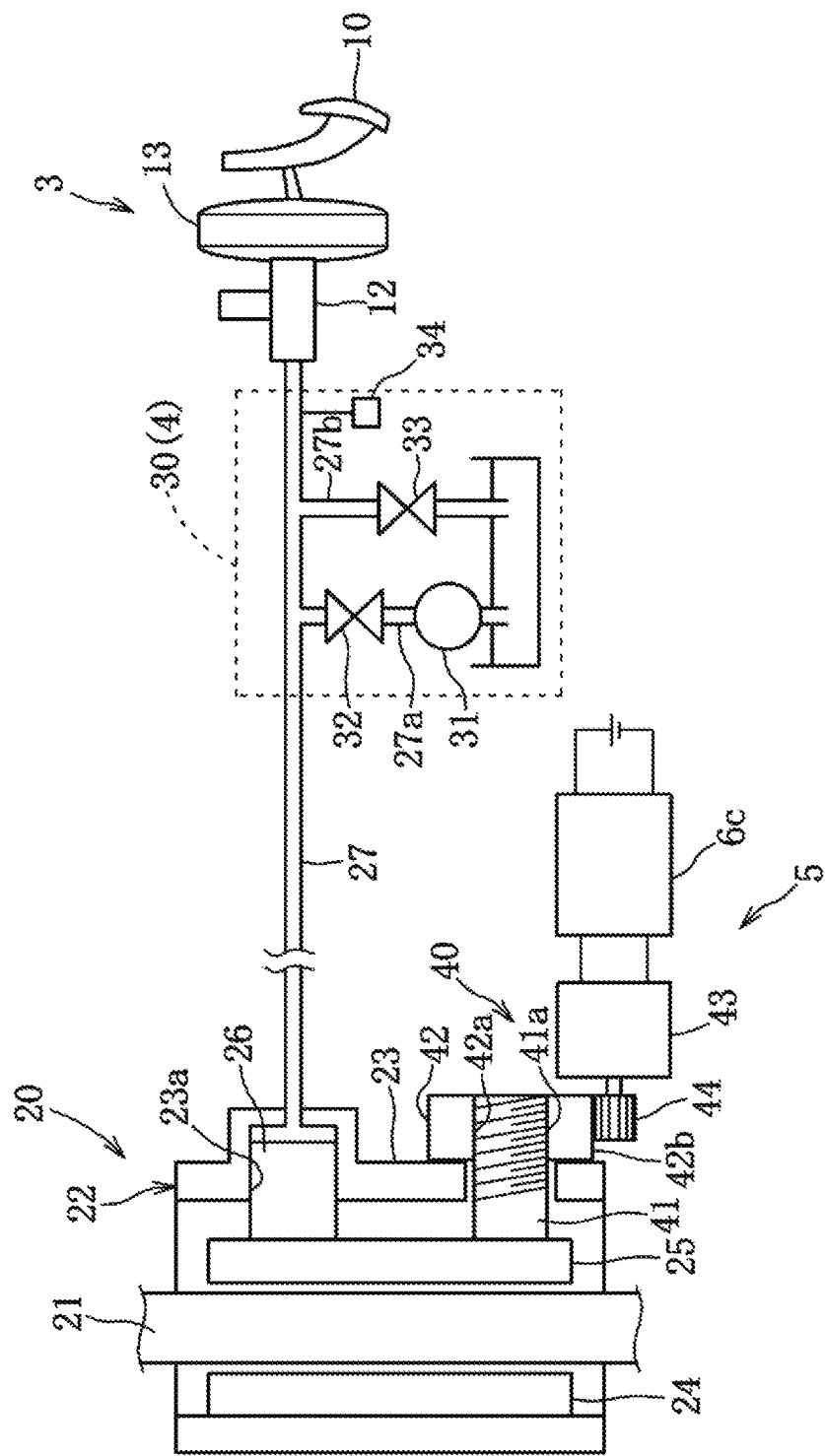
FIG. 3 is a schematic view illustrating part of a foot brake device, a DSC system, and an electric parking brake (EPB) system.

As illustrated in FIGS. 1 and 3, the foot brake device 3 includes the brake pedal 10, a master cylinder 12, a booster 13, and the hydraulic brake mechanisms 20.

The booster 13 has a wall (not illustrated) movable in its axial directions in conjunction with the brake pedal 10, and boosts up the depression force of the brake pedal 10 by using a difference in pressure between a negative pressure chamber and an atmospheric pressure chamber which are divided from each other by the movable wall. The hydraulic brake mechanisms 20 provided to the respective vehicle wheels 11 are connected with the master cylinder 12 by a pipe 27, so as to apply a brake force to the respective vehicle wheels 11 according to the depression of the brake pedal 10 performed by the driver.

As illustrated in FIG. 3, each hydraulic brake mechanism 20 includes a rotor disk 21 provided with the vehicle wheel 11 to be integrally rotatable, and a caliper 22 for applying the brake force to the rotor disk 21. The caliper 22 has a caliper body 23 mounted over the rotor disk 21, and an outer brake pad 24 and an inner brake pad 25 which are provided inside the caliper body 23 and interpose the rotor disk 21 therebetween.

A piston 26 is disposed on the inner side of the inner brake pad 25 to be movable in axial directions of the rotor disk 21, and the piston 26 is slidably fitted into a cylinder hole 23a which is formed in the caliper body 23. The cylinder hole 23a is connected to the pipe 27.

When the driver depresses the brake pedal 10, the hydraulic brake pressure is applied to the cylinder hole 23a through the pipe 27, and moves the piston 26 outwardly in the axial directions.

Accordingly, the inner brake pad 25 is pushed against the inner side of the rotor disk 21, and due to a counterforce against this, the caliper body 23 moves inward and the outer brake pad 24 is pushed against the outer side of the rotor disk 21. Thus, the brake force of the foot brake device 3 is produced.

Next, the DSC system 4 is described.

The DSC system 4 brakes the vehicle wheels 11 independently from the depression of the brake pedal 10. The DSC system 4 enters a first stop mode in which a stopped state of the vehicle V is maintained starting when an auto hold execution condition (an auto hold switch 60 is turned on and the vehicle V is in the stopped state) is satisfied, until an auto hold release condition (the accelerator pedal 14 is depressed) is satisfied.

Note that the stopped state of the vehicle V is determined by using a determination condition, such as the depression of the brake pedal 10 continuing for over a given period of time.

As illustrated in FIG. 2, the DSC system 4 is comprised of a DSC controlling module 6b and a pressurizing unit 30 (pressurizer).

The DSC controlling module 6b performs a DSC control so as to improve travel stability in turning the vehicle V in response to the input signals from the various sensors. For example, when a turning attitude of the vehicle V is determined to be deviated by a given value or above based on detection signals from a yaw-rate sensor 53, a lateral acceleration sensor 55, and vehicle wheel speed sensors 56, the DSC controlling module 6b controls the brake force on the vehicle wheels 11 by operating the pressurizing unit 30, so as to orient the turning attitude of the vehicle V to a target direction by causing a yaw moment to act on a vehicle body.

Further the DSC controlling module 6b performs an ABS control so as to prevent the respective vehicle wheels 11 from being locked in response to the input signals from the various sensors. For example, when a slip ratio of each vehicle wheel 11 is calculated based on a detection signal of the vehicle wheel speed sensor 56 and a vehicle wheel 11 for which the calculated slip ratio exceeds a given threshold is detected, the DSC controlling module 6b prevents the locking of this vehicle wheel 11 by controlling the operation of the pressurizing unit 30 to reduce the brake force which acts on the vehicle wheel 11.

The DSC system 4 has, in addition to the attitude control functions like the DSC control and the ABS control, a brake device function that enters the first stop mode in which the stopped state of the vehicle V is maintained.

When entering the first stop mode, the DSC controlling module 6b controls the pressurizing unit 30 to continuously hold an initial hydraulic brake pressure P0 according to the depression of the brake pedal 10 by the driver, and when canceling the first stop mode, the DSC controlling module 6b controls the pressurizing unit 30 to release the initial hydraulic brake pressure P0 at a given release rate.

As illustrated in FIG. 3, the pressurizing unit 30 includes a hydraulic pump 31, a pressurizing valve 32, a return valve 33, and a hydraulic brake pressure sensor 34 for detecting hydraulic brake pressure within the pipe 27.

The hydraulic pump 31 is disposed in a first branch path 27a branching from the pipe 27 and is constructed by an electric pump having an electric motor as its drive source. The hydraulic pump 31 receives electric power from an alternator while the engine is in operation, and receives electric power from a vehicle-mounted battery (not illustrated) while the engine is stopped. The hydraulic pump 31 is controlled by the DSC controlling module 6b.

The pressurizing valve 32 is disposed in the first branch path 27a between the hydraulic pump 31 and the pipe 27, and the return valve 33 is disposed in a second branch path 27b branching from the pipe 27. The valves 32 and 33 are constructed by electromagnetic valves and controlled by the DSC controlling module 6b.

Next, the EPB system 5 is described.

The EPB system 5 is driven independently from the depression of the brake pedal 10 and enters a second stop mode in which the stopped state of the vehicle V is maintained when a given condition is satisfied.

As illustrated in FIG. 2, the EPB system 5 is comprised of an EPB controlling module 6c and electric brake mechanisms 40.

The EPB controlling module 6c controls the vehicle wheel brake force of the electric brake mechanisms 40 in response to the input signals from the various sensors. For example, the EPB controlling module 6c controls the vehicle wheel brake force of the electric brake mechanisms 40 to a given load, based on an ON signal of a parking switch 59 and an execution signal of the second stop mode.

As illustrated in FIG. 3, each electric brake mechanism 40 includes a piston 41, an annular member 42, and an electric motor 43.

A male thread portion 41a is formed on an inner end portion of the piston 41 and engaged with a female thread portion 42a formed on a circumferentially inner surface of the annular member 42. A gear surface portion 42b is formed on a circumferentially outer surface of the annular member 42 and engaged with a pinion 44 attached to a drive shaft of the electric motor 43 to be integrally rotatable. Therefore, by driving the electric motor 43, the annular member 42 is rotationally driven and the piston 41 is moved to progress/retreat in its axial directions.

Next, the ECU 6 is described.

The ECU 6 is comprised of a processor 6e (e.g., a CPU (Central Processing Unit)), a ROM, a RAM, an inside interface, and an outside interface. The processor 6e is configured to execute the various modules and submodules 6a to 6d of the ECU 6.

The ROM stores various programs and data for brake force control, and the RAM is provided with a processing area for the processor 6e to use when performing a series of processes.

When the auto hold switch 60 is turned on and the vehicle V is detected to be in the stopped state, which includes the automatic stop of the engine, the ECU 6 operates the brake device (here, the DSC system 4) to enter the first stop mode to maintain the stopped state of the vehicle V. When the gear shift lever 9a is in the P-range and an ignition switch 62 is turned off in the first stop mode, the ECU 6 operates the EPB system 5 to maintain the stopped state of the vehicle V and cancels the first stop mode.

As illustrated in FIG. 2, the ECU 6 is electrically connected to a brake lamp switch 51, an accelerator sensor 52, the yaw-rate sensor 53, a steering angle sensor 54, the lateral acceleration sensor 55, the vehicle wheel speed sensors 56, an engine speed sensor 57, a gradient sensor 58, the parking switch 59, the auto hold switch 60, the gear position sensor 61, the ignition switch 62, the hydraulic brake pressure sensor 34, etc.

The brake lamp switch 51 outputs a detection signal upon detecting the depression of the brake pedal 10 performed by the driver, and the accelerator sensor 52 outputs a detection signal upon detecting a depressed amount of the accelerator pedal 14. The yaw-rate sensor 53 outputs a signal corresponding to a yaw rate of the vehicle V, and the steering angle sensor 54 outputs a signal relating to a steering angle of a steering wheel (not illustrated) controlled by the driver. The lateral acceleration sensor 55 outputs a signal relating to an acceleration of the vehicle V in vehicle width directions, and the vehicle wheel speed sensors 56 output signals based on rotational speeds of the vehicle wheels 11, respectively.

The engine speed sensor 57 outputs a signal based on the engine speed, the gradient sensor 58 outputs a signal based on an inclination of a road surface where the vehicle V is stopped, and the hydraulic brake pressure sensor 34 outputs a signal based on hydraulic brake pressure within the pipe 27.

The gear position sensor 61 outputs a detection signal upon detecting the gear range selected by the driver. The ignition switch 62 outputs a detection signal upon detecting an ON/OFF state thereof.

The parking switch 59 operates the EPB system 5 to stop the vehicle V. The parking switch 59 is turned on/off by the driver. In the ON state, the parking switch 59 constantly outputs an ON signal to the ECU 6, and in the OFF state, the parking switch 59 constantly outputs an OFF signal to the ECU 6. The auto hold switch 60 automatically maintains the stopped state of the vehicle V even when the driver removes his/her foot from the brake pedal 10 while waiting at a traffic light or in heavy traffic jam. This auto hold switch 60 is turned on/off by the driver. In the ON state, the auto hold switch 60 constantly outputs an ON signal to the ECU 6, and in the OFF state, the auto hold switch 60 constantly outputs an OFF signal to the ECU 6.

As illustrated in FIG. 2, the ECU 6 is integrally provided with the processor 6e configured to execute the ENG controlling module 6a, the DSC controlling module 6b, the EPB controlling module 6c.

In the restart of the engine 7, the DSC controlling module 6b controls the hydraulic brake pressure to have a characteristic in which a final release rate v3 of the hydraulic brake pressure which is applied after reaching a first medium hydraulic pressure P1 set near a highest hydraulic brake pressure Pu of a stick-slip occurable range A is higher than an intermediate release rate v2 of the hydraulic brake pressure before reaching the first medium hydraulic pressure P1. The stick-slip occurable range A is a range within which repetition of a static-frictional engagement and a dynamic-frictional engagement may occur in the hydraulic brake mechanisms 20. Further in the characteristic, the brake force corresponding to hydraulic brake pressure at the final release rate v3 falls below the drive force of the engine 7 after the drive force stabilized timing.

The DSC controlling module 6b includes a release rate setting submodule 6d for setting hydraulic pressure release rates for initial, intermediate, and final (late) stages of the hydraulic brake pressure release. The initial release rate corresponds to an early half of an early-stage release rate, and the intermediate release rate corresponds to a latter half of the early-stage release rate.

The release rate setting submodule 6d stores an initial first medium hydraulic pressure P1a which is slightly above the highest hydraulic brake pressure Pu of the stick-slip occurable range A, and an initial second medium hydraulic pressure P2a which is higher than the initial first medium hydraulic pressure P1a by a given pressure. The difference between the initial first medium hydraulic pressure P1a and the initial second medium hydraulic pressure P2a is set by taking into consideration a load increase which accompanies operations of in-vehicle electric components (e.g., an air conditioner) and an idle speed increase correction by a fuel injection control, and it is set so that the brake force corresponding to the initial second medium hydraulic pressure P2a is above the drive force of the engine 7 even when the drive force is at its highest in hunting while cranking.

The stick-slip occurable range A is a particular range within which the repetition of the static-frictional engagement and the dynamic-frictional engagement may occur in the hydraulic brake mechanisms 20, and it is set uniformly for every vehicle V based on material properties etc. of the rotor disk 21 and the pads 24 and 25. The highest hydraulic brake pressure Pu and a lowest hydraulic brake pressure Pd of the stick-slip occurable range A are set based on specifications of the vehicle V.

Figure 4:
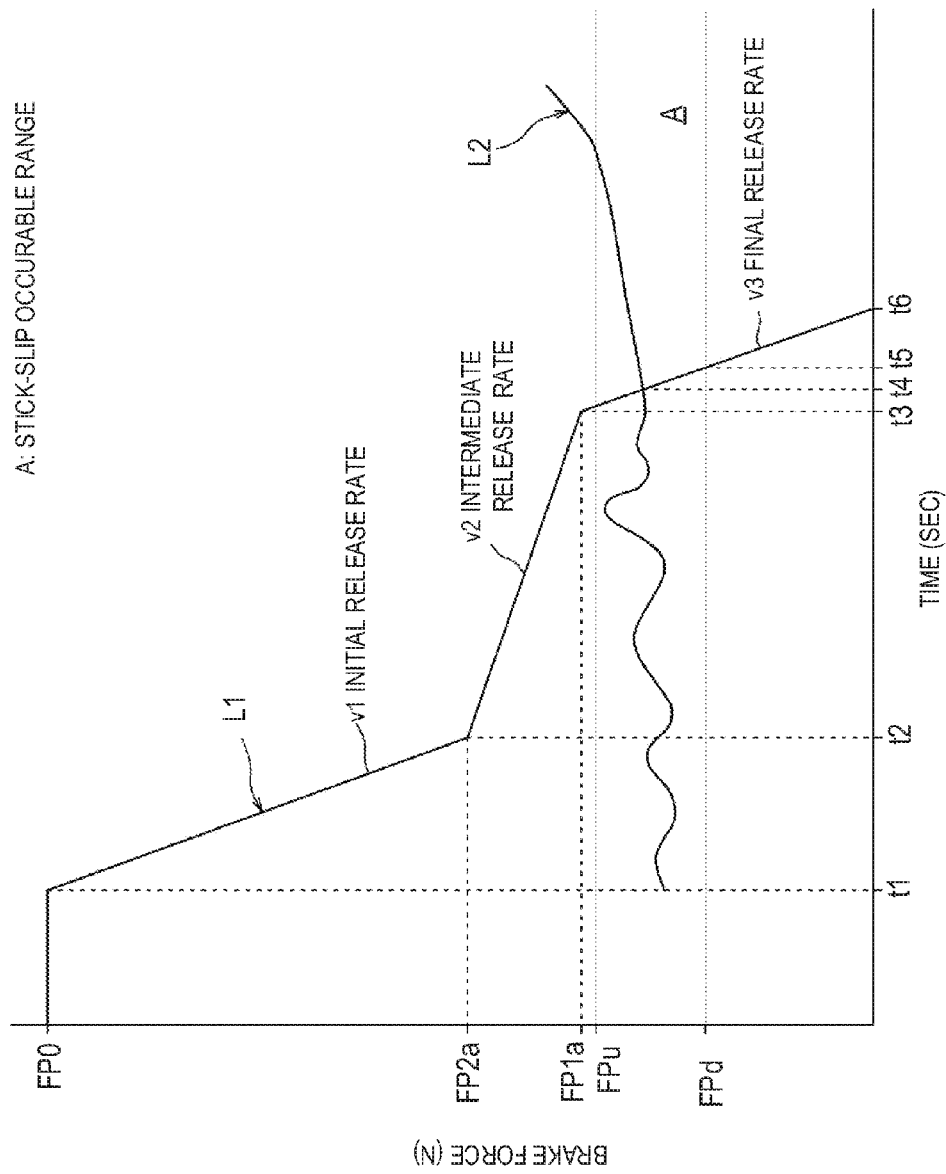
FIG. 4 is a release characteristic graph of a brake force when an engine restarts.

FIG. 4 illustrates a release characteristic L1 of the brake force in the engine restart.

The reference character "L2" indicates a drive force characteristic of the engine 7 after the engine restart.

In the release characteristic L1 of the brake force, the brake force corresponding to the initial hydraulic brake pressure P0 is FP0, the brake force corresponding to the first medium hydraulic pressure P1a is FP1a, the brake force corresponding to the second medium hydraulic pressure P2a is FP2a, the brake force corresponding to the highest hydraulic brake pressure Pu is FPu, and the brake force corresponding to the lowest hydraulic brake pressure Pd is FPd.

Since the brake force is in proportion to the hydraulic brake pressure, the release characteristic L1 of the brake force may be considered as the release characteristic of the hydraulic brake pressure, and the release rates v1 to v3 of the brake force may be considered as the release rates of the hydraulic brake pressure. Accordingly, the release characteristic of the hydraulic brake pressure is described using the release characteristic L1 of the brake force. Further, as needed, the release characteristic L1 and the release rates v1 to v3 of the brake force may be described as those of the hydraulic brake pressure similarly to the characteristic of the brake force.

As illustrated in FIG. 4, the release rate of the initial hydraulic brake pressure P0 is comprised of the initial release rate v1 between the engine restart (t1) and a cranking completion proximity timing (t2), the intermediate release rate v2 between t2 and the drive force stabilized timing (t3), and the final release rate v3 between t3 and the hydraulic brake pressure release completion timing (t6). The initial release rate v1 is set to bring the hydraulic brake pressure at t2 to the second medium hydraulic pressure P2, and the intermediate and final release rates v2 and v3 are set to bring the hydraulic brake pressure at t3 to the first medium hydraulic pressure P1.

The initial release rate v1 is substantially the same as the final release rate v3, and the final release rate v3 is higher than the intermediate release rate v2.

Since creep groan occurs when the release characteristics L1 and L2 are both within the stick-slip occurable range A and the release characteristic L2 is above the release characteristic L1, the occurring period of the creep groan is from a timing t4 when the brake force corresponding to the hydraulic brake pressure matches the drive force of the engine 7, to a timing t5 when the brake force corresponding to the hydraulic brake pressure matches the brake force FPd that corresponds to the lowest hydraulic brake pressure Pd.

The release rate setting submodule 6d increases the first medium hydraulic pressure P1 according to an inclination of the attitude (orientation) of the vehicle V (road surface gradient). For example, when a road surface has a gradient at which the vehicle is oriented so that a front part is obliquely upward of a rear part and a downforce caused by the gravity which acts on the vehicle V becomes equal to or above the creep torque of the vehicle V (e.g., 6° or above), the release rate setting submodule 6d determines that the vehicle V has an upward orientation and increase-corrects the first medium hydraulic pressure P1 to P1b (P1a<P1b) according to the gradient.

Figure 5:
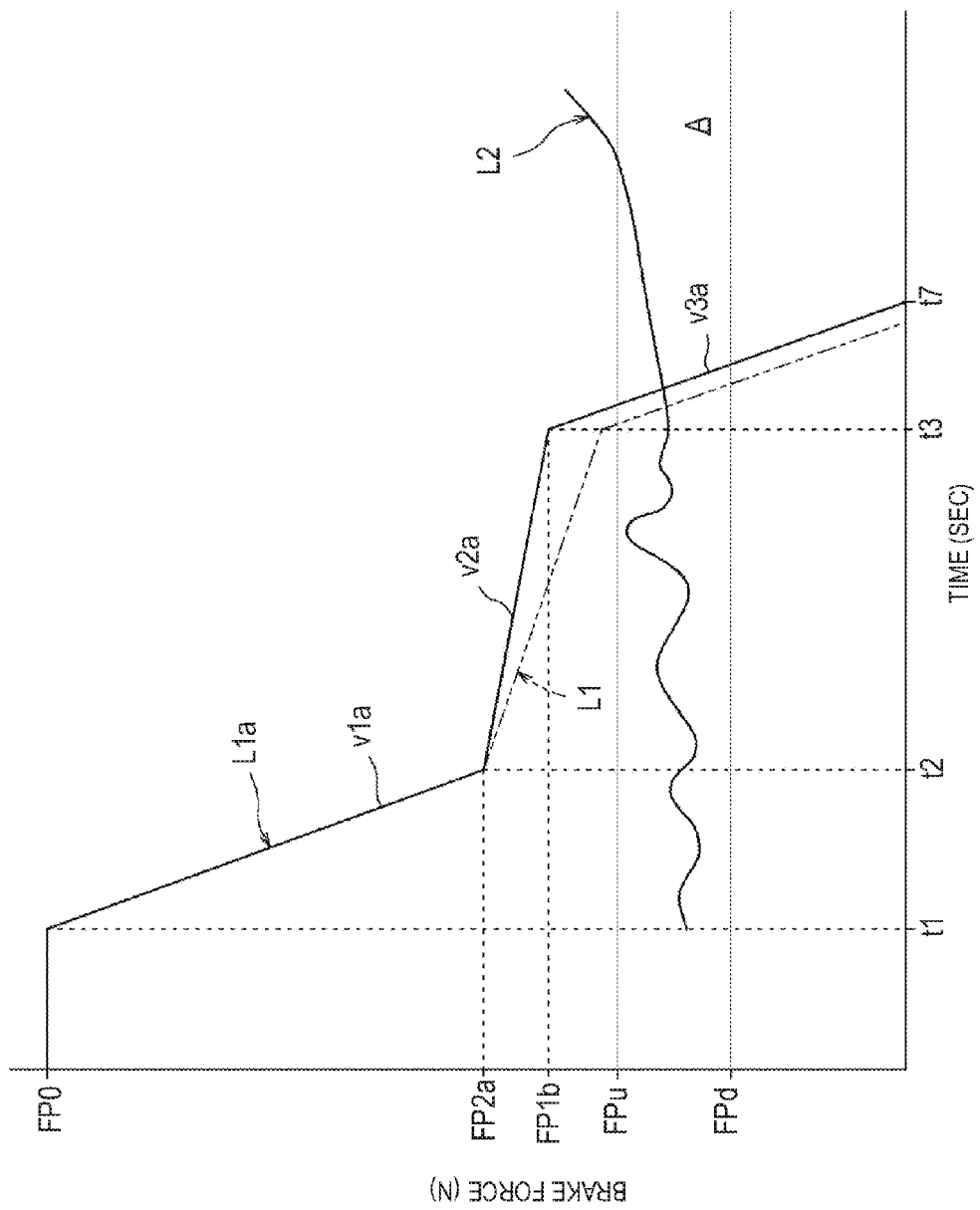
FIG. 5 is a release characteristic graph of a brake force when a first medium hydraulic pressure is corrected to increase.

As illustrated in FIG. 5, in a release characteristic L1a, an intermediate release rate v2a is set lower than the intermediate release rate v2 since the first medium hydraulic pressure P1 at t3 is increased from P1a to P1b. Note that the initial and final release rates v1a and v3a are set substantially the same as the release rates v1 and v3, respectively, and the release completion timing is t7.

The release rate setting submodule 6d increase-corrects the second medium hydraulic pressure P2 to P2b (P1b<P2b) so that the second medium hydraulic pressure P2 is above the first medium hydraulic pressure P1b when the first medium hydraulic pressure P1b exceeds the initial second medium hydraulic pressure P2a.

Figure 6:
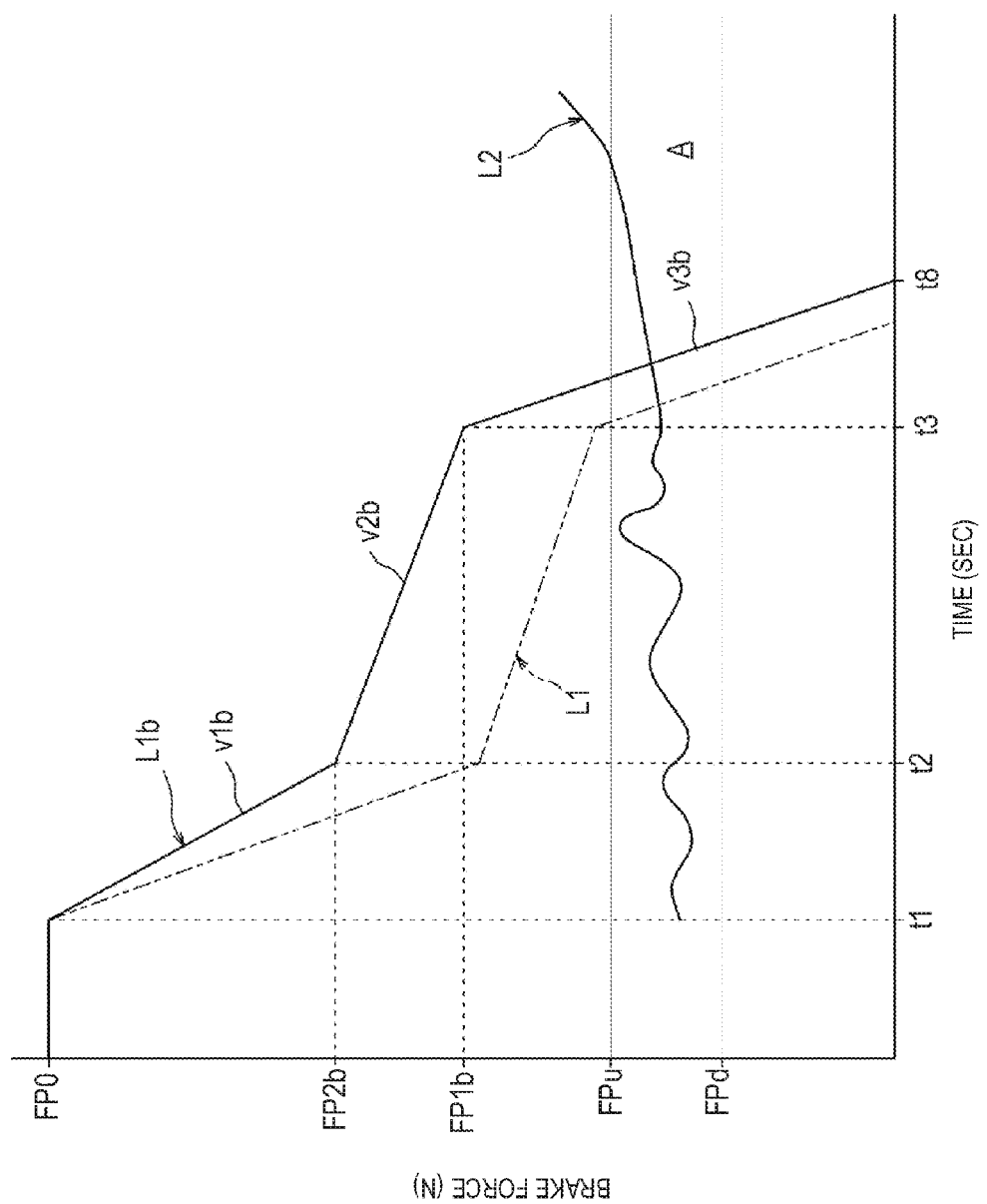
FIG. 6 is a release characteristic graph of a brake force when first and second medium hydraulic pressures are corrected to increase.

As illustrated in FIG. 6, in a release characteristic L1b, an initial release rate v1b is set lower than the initial release rate v1 since the second medium hydraulic pressure P2 at t2 is increased from P2a to P2b. Further an intermediate release rate v2b is set substantially the same as the intermediate release rate v2 since an increase amount of the second medium hydraulic pressure P2 at t2 is substantially the same as an increase amount of the first medium hydraulic pressure P1. Note that, a final release rate v3b is set substantially the same as the release rate v3 and the release completion timing is t8.

Next, procedures of the stop maintaining control process are described with reference to the flowcharts of FIGS. 7 and 8. Note that in FIGS. 7 and 8, Si (i=1, 2, . . . ) indicates a step for each process.

Figure 7:
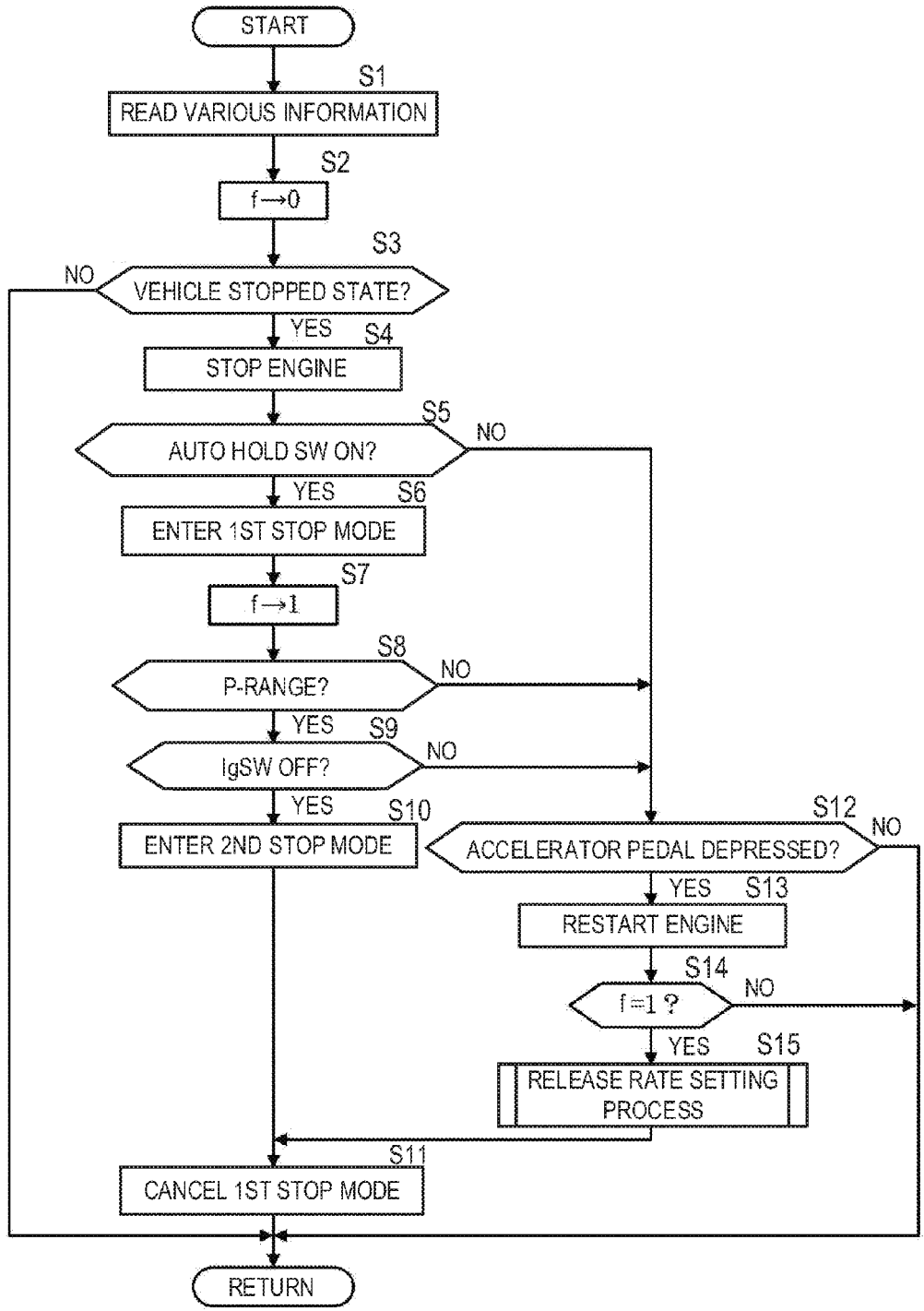
FIG. 7 is a flowchart of stop maintaining control process.

As indicated in the flowchart of FIG. 7, in the stop maintaining control process, first in S1, information such as the detection values of the respective sensors and the initial first and second medium hydraulic pressures P1a and P2a is read, and then the process proceeds to S2.

In S2, a flag f is set to 0.

Next in S3, whether or not the vehicle V is in the stopped state is determined.

If the vehicle V is in the stopped state as a result of S3, the process proceeds to S4 where the engine 7 is stopped.

If the vehicle V is not in the stopped state as the result of S3, the process returns to the start of the process.

After S4, in S5 it is determined whether or not the auto hold switch 60 is turned on.

If the auto hold switch 60 is turned on as a result of S5, the process proceeds to S6 where the DSC system 4 enters the first stop mode so as to reduce a burden on the driver which accompanies the depression of the brake pedal 10. In S6, the initial hydraulic brake pressure P0 corresponding to the depression of the brake pedal 10 by the driver is maintained, and the brake force corresponding to the initial hydraulic brake pressure P0 is applied to the hydraulic brake mechanisms 20.

The flag f is set to 1 in S7, then the process proceeds to S8 where it is determined whether or not the gear range is the P-range.

If the gear range is the P-range as a result of S8, the process proceeds to S9 where it is determined whether or not the ignition switch 62 is turned off.

If the ignition switch 62 is turned off as a result of S9, the vehicle V is in the stopped state, and therefore, the process proceeds to S10 where the second stop mode is entered.

Next in S11, the first stop mode is canceled and then the process returns.

In S11, if the engine 7 is stopped and the EPB system 5 is operated, the initial hydraulic brake pressure P0 is released at a highest rate without setting the first and second medium hydraulic pressures P1 and P2.

If the auto hold switch 60 is not turned on as the result of S5, the process proceeds to S12 where it is determined whether or not the accelerator pedal 14 is depressed by the driver.

If the gear range is not the P-range as the result of S8 or if the ignition switch 62 is not turned off as the result of S9, the process also proceeds to S12.

If the accelerator pedal 14 is depressed by the driver as a result of S12, the process proceeds to S13 where the engine 7 is restarted.

Next in S14, it is determined whether or not the flag f is 1.

If the flag f is 1 as a result of S14, since the first stop mode is entered, a release rate setting process (S15) is performed and then the process proceeds to S11. In S11, the initial hydraulic brake pressure P0 is released based on the hydraulic brake pressure release rate characteristic set in S15.

If the flag f is not 1 as the result of S14, since the first stop mode is not entered, the process returns. If the accelerator pedal 14 is not depressed by the driver as the result of S12, the engine 7 is maintained stopped and the process returns.

Figure 8:
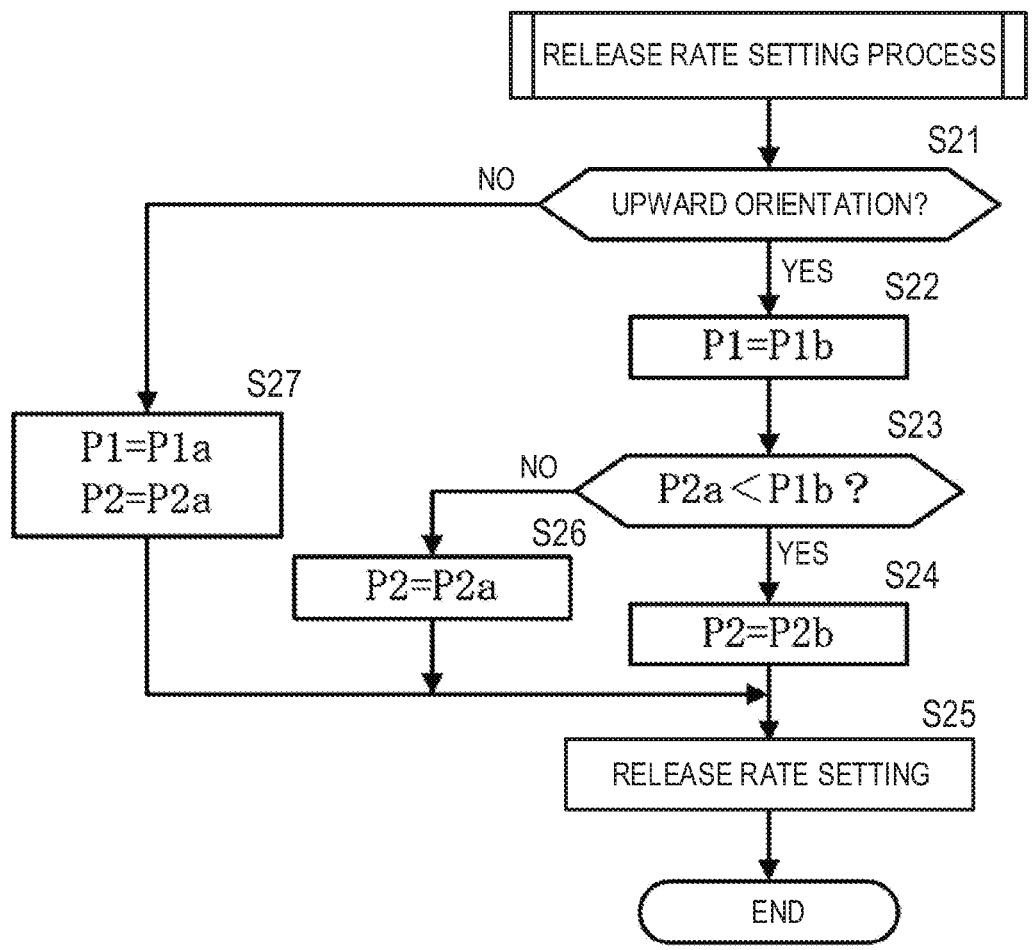
FIG. 8 is a flowchart of release rate setting process.

The release rate setting process is described based on the flowchart of FIG. 8.

First in S21, it is determined whether or not the vehicle V is in the upward orientation.

If the vehicle V is in the upward orientation as a result of S21, the process proceeds to S22 where the first medium hydraulic pressure P1 is set by increase-correcting the initial first medium hydraulic pressure P1a to P1b.

In the upward orientation, if the downforce caused by the gravity which acts on the vehicle V is equal to or above the creep torque of the vehicle V and the first stop mode is canceled in such a state, the vehicle V may stall. Therefore, the first medium hydraulic pressure P1 is set to P1b which is above P1a.

Next in S23, it is determined whether or not the set first medium hydraulic pressure P1b is above the initial second medium hydraulic pressure P2a.

If the set first medium hydraulic pressure P1b is above the second medium hydraulic pressure P2a as a result of S23, the process proceeds to S24 where the second medium hydraulic pressure P2 is set by increase-correcting the initial second medium hydraulic pressure P2a to P2b which is above the first medium hydraulic pressure P1b (see FIG. 6).

In S25, the hydraulic brake pressure release rate characteristic is set based on the set first and second medium hydraulic pressures P1 and P2, and the timings corresponding to the set first and second medium hydraulic pressures P1 and P2, respectively.

If the set first medium hydraulic pressure P1b is the initial second medium hydraulic pressure P2a or below as the result of S23, the initial second medium hydraulic pressure P2a is set to be the second medium hydraulic pressure P2 (S26) and the process proceeds to S25 (see FIG. 5). If the vehicle V is not in the upward orientation as the result of S21, the initial first and second medium hydraulic pressures P1a and P2a are set to be the first and second medium hydraulic pressures P1 and P2 (S27) and the process proceeds to S25 (see FIG. 4).

Thus, the release rate setting process ends.

Next, operations and effects of the stop maintaining system 1 are described.

According to the stop maintaining system 1 of this embodiment, since the ENG controlling module 6a for determining the drive force stabilized timing when the drive force of the engine 7 stabilizes is provided, it is possible to determine the drive force stabilized timing.

In the restart of the engine 7, the ECU 6 (DSC controlling module 6b) controls the hydraulic brake pressure to have the characteristic in which the final release rate v3 of the hydraulic brake pressure which is applied after reaching the first medium hydraulic pressure P1 set near the highest hydraulic brake pressure Pu of the stick-slip occurable range A (the range within which the repetition of the static-frictional engagement and the dynamic-frictional engagement may occur in the hydraulic brake mechanisms 20) is higher than the intermediate release rate v2 of the hydraulic brake pressure before reaching the first medium hydraulic pressure P1. Thus, the period for which the hydraulic brake pressure remains within the stick-slip occurable range A is shortened, which reduces the generation of creep groan. Additionally in the restart of the engine 7, the ECU 6 controls the hydraulic brake pressure to have the characteristic in which the brake force corresponding to the hydraulic brake pressure at the final release rate v3 falls below the drive force of the engine 7 after the drive force stabilized timing (t3). Thus, the vehicle wheels 11 are started to be driven after the drive force of the engine 7 stabilizes, which prevents the engine stall and improves the starting performance of the vehicle V.

The period for which the early-stage release rate of the hydraulic brake pressure is applied is divided into a first period corresponding to the initial release rate v1 applied between the initial hydraulic brake pressure P0 and the second medium hydraulic pressure P2 which is set higher than the first medium hydraulic pressure P1, and a second period corresponding to the intermediate release rate v2 applied between the second medium hydraulic pressure P2 and the first medium hydraulic pressure P1. The initial release rate v1 is set higher than the intermediate release rate v2.

By setting the intermediate release rate v2 to be lower, the period for which high hydraulic brake pressure acts on the DSC system 4 is shortened. By shortening the period from the timing (t3) of the first medium hydraulic pressure P1 to the timing (t4) when the brake force corresponding to the hydraulic brake pressure falls below the drive force of the engine 7, energy accumulated in the hydraulic brake mechanisms 20 etc. is reduced even more.

The intermediate release rate v2 is set so that the hydraulic brake pressure reaches the first medium hydraulic pressure P1 after the drive force stabilized timing (t3). Therefore, it is possible to easily set the characteristic of the hydraulic brake pressure to the characteristic in which the brake force corresponding to the hydraulic brake pressure at the final release rate v3 falls below the drive force of the engine 7 after the drive force stabilized timing.

The ECU 6 increases the first medium hydraulic pressure P1 according to the orientation of the vehicle V and, when the increased first medium hydraulic pressure P1b exceeds the second medium hydraulic pressure P2a, increases the second medium hydraulic pressure P2 to P2b so that it exceeds the first medium hydraulic pressure P1b. Thus, the generation of the creep groan is reduced without causing the engine stall even if the vehicle V is in the upward orientation.

Next, modifications designed by partially changing the embodiment are described.

(1) The embodiment described above provides the example in which the ENG controlling module determines the drive force stabilized timing based on the elapsed time from the engine restart; however, since a drive torque which is expressible by a product of an engine load and an engine speed is in proportion to the drive force, the behavior of the drive force in the engine restart may be detected based on the engine speed to determine the drive force stabilized timing.

Further, the first and second medium hydraulic pressures may be set after actual drive force stabilized timing determination.

(2) The embodiment described above provides the example of setting to the first medium hydraulic pressure the hydraulic brake pressure of the brake force release characteristic at the timing when the drive force stabilizes; however, as long as the brake force release characteristic intersects the drive force characteristic from the higher value side after the drive force stabilized timing, the first medium hydraulic pressure may be set earlier than the drive force stabilized timing.

(3) The embodiment described above provides the example of increase-correcting the first medium hydraulic pressure according to the orientation state of the vehicle, and increase-correcting the second medium hydraulic pressure when the increased first medium hydraulic pressure exceeds the second medium hydraulic pressure; however, the first and second medium hydraulic pressures may be increased by the same amount in synchronization so that the intermediate release rate becomes constant even after the correction. Further, the vehicle orientation state may be divided into a plurality of ranges, and a basic release rate map may be stored for every range, and the correction may be linear within the ranges.

(4) The embodiment described above provides the example in which both of the engine restart condition after an automatic engine stop, and the auto hold release condition are the execution of depression of the accelerator pedal; however, the engine restart condition may be the switch from the D-range to the R-range, or one of the execution of depression of the accelerator pedal and the switch to one of the travel ranges.

Alternatively, the engine restart condition may be the release of depression of the brake pedal and the execution of depression of the accelerator pedal.

(5) The embodiment described above provides the example of providing the DSC controlling module and the EPB controlling module integrally with the ECU; however, the DSC system and the EPB system may be configured such that the DSC controlling module and the EPB controlling module are provided independently from the ECU, respectively. In this case, the execution commands of the first and second stop modes are outputted from the ECU to the DSC controlling module and the EPB controlling module, respectively.

Further, the pressurizing unit and the DSC controlling module may be formed integrally so that the execution command of the first stop mode is directly outputted from the ECU to the pressurizing unit.

(6) Those skilled in the art may implement a variety of other modes by adding various changes to the embodiment without departing from the scope of the present invention, and such modes fall under the scope of the present invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

V Vehicle
1 Stop Maintaining System
2 Idle Stop Device
3 Foot Brake Device
4 DSC System
6 ECU
6a ENG Controlling Module
6b DSC Controlling Module
6c Release Rate Setting Module
8 Automatic Transmission
10 Brake Pedal
11 Vehicle Wheel
14 Accelerator Pedal
30 Pressurizing Unit
A Stick-slip Occurable Range
Pu Highest Hydraulic Brake Pressure
P1 First Medium Hydraulic Pressure
P2 Second Medium Hydraulic Pressure
v1 Initial Release Rate
v2 Intermediate Release Rate
v3 Final Release Rate

What is claimed is:

1. A vehicle stop maintaining system comprising:
an automatic transmission;
an automatic stop-restart mechanism configured to automatically stop and restart an engine according to an operating state of a vehicle in a transmittable state of a drive torque of the engine to vehicle wheels;
a foot brake mechanism configured to brake the vehicle wheels through hydraulic brake mechanisms;
a brake force control mechanism comprising a pressurizer that increases hydraulic brake pressure that is applied to the hydraulic brake mechanisms, and for braking the vehicle wheels by controlling the pressurizer independently from a depression of a brake pedal;
a controller comprising a processor configured to maintain a stopped state of the vehicle when a stopped state is detected by operating the automatic stop-restart mechanism to stop the engine and operating the brake force control mechanism to maintain an initial hydraulic brake pressure according to the brake pedal depression, the controller operating the automatic stop-restart mechanism to restart the engine and operating the brake force control mechanism to release the initial hydraulic brake pressure when at least the depression of an accelerator pedal is detected, the processor further configured to execute a drive force state determining module to determine a drive force stabilized timing when the drive force of the engine stabilizes, wherein in the restart of the engine, the controller controls the hydraulic brake pressure to have a characteristic in which a late-stage release rate of the hydraulic brake pressure that is applied after reaching a first medium hydraulic pressure set near a highest hydraulic brake pressure of a stick-slip occurable range is higher than an early-stage release rate of the hydraulic brake pressure before reaching the first medium hydraulic pressure, and the brake force corresponding to hydraulic brake pressure at the late-stage release rate falls below the drive force of the engine after the drive force stabilized timing, the stick-slip occurable range being a range that has a possibility of causing repetition of a static-frictional engagement and a dynamic-frictional engagement in the hydraulic brake mechanisms.

2. The system of claim 1, wherein a period for which the early-stage release rate of the hydraulic brake pressure is applied is divided into a first period corresponding to an initial release rate applied between the initial hydraulic brake pressure and a second medium hydraulic pressure that is set higher than the first medium hydraulic pressure, and a second period corresponding to an intermediate release rate applied between the second medium hydraulic pressure and the first medium hydraulic pressure, and wherein the initial release rate is set higher than the intermediate release rate.

3. The system of claim 2, wherein the intermediate release rate is set so that the hydraulic brake pressure reaches the first medium hydraulic pressure after the drive force stabilized timing.

4. The system of claim 3, wherein the controller increases the first medium hydraulic pressure according to an orientation of the vehicle and, when the increased first medium hydraulic pressure becomes higher than the second medium hydraulic pressure, increases the second medium hydraulic pressure to exceed the increased first medium hydraulic pressure.

5. The system of claim 2, wherein the controller increases the first medium hydraulic pressure according to an orientation of the vehicle and, when the increased first medium hydraulic pressure becomes higher than the second medium hydraulic pressure, increases the second medium hydraulic pressure to exceed the increased first medium hydraulic pressure.

* * * * *